Feb. 22, 1966    E. STAUBER    3,236,359
DEVICE FOR THE SEQUENTIAL ASSEMBLY OF SMALL-SIZED APPARATUS
Filed March 20, 1964    2 Sheets-Sheet 1
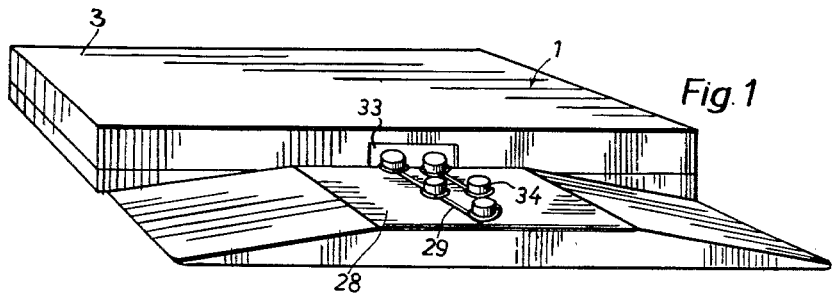
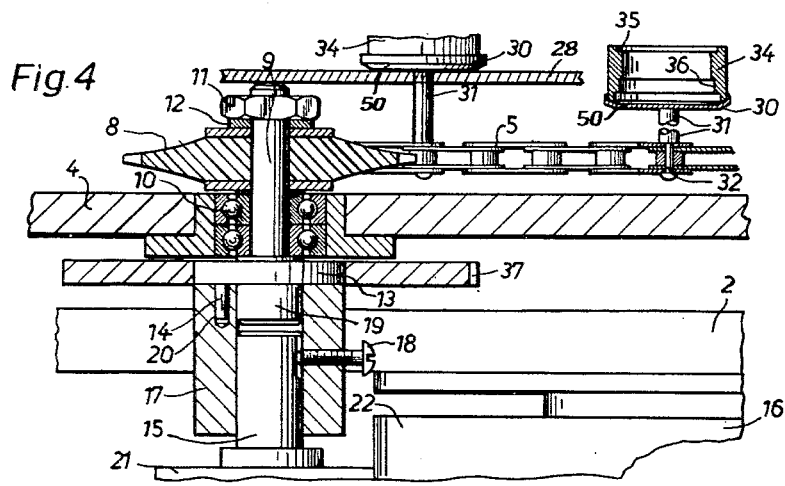
ERNST STAUBER
INVENTOR
BY Wenderoth, Lind & Ponack
ATTORNEYS

United States Patent Office 3,236,359
Patented Feb. 22, 1966

3,236,359
DEVICE FOR THE SEQUENTIAL ASSEMBLY OF SMALL-SIZED APPARATUS
Ernst Stauber, Lengnau, Switzerland, assignor to Langendorf Watch Co., Langendorf, Switzerland
Filed Mar. 20, 1964, Ser. No. 353,513
Claims priority, application Switzerland, Apr. 2, 1963, 4,208/63, 4,209/63
9 Claims. (Cl. 198—131)

The present invention relates to a device for the sequential assembly of small-sized apparatus such as watch-movements, micro-switches, voltmeters, ammeters and the like, of the type comprising conveying means supporting and guiding a series of supports adapted to receive each, in position for assembling, one apparatus to be assembled, these supports being arranged to their greater part, above a platform in a housing or casing where they are protected from moisture and dust, this housing or casing having an opening affording for the passage of the supports with their apparatus towards a working place to which they are successively brought by driving means.

In such a device all small-sized apparatus of a series to be assembled, exception made of the one that is actually worked on, and perhaps the immediate adjacent ones are effectively protected from dust within the casing or housing.

Such assembling devices are described in detail for example in application Serial No. 199,154, filed May 31, 1962, by Michel Mouche and Ernst Stauber.

The present invention makes use of the relative movement occurring, when the device is in operation, between the conveying means, the supports and the small-sized apparatus on the one hand and the stationary parts of the device such as the housing and the platform on the other hand, to keep free from dust the air in the housing and thus to even better protect the apparatus stored in this housing, even if they are going to stay in the device for a longer time.

This prime object of the invention is attained in a device of the aforementioned type by making at least the portions of the supports, which come into frictional contact with stationary portions of the device when the latter is in operation, of a material producing, by friction with the material of the stationary portions of the device, an electro-statical effect to the end of attracting dust particles suspended in the air within the housing or casing.

For example the platform and at least the portions of the supports sliding on said paltform may be made of materials producing an electrostatical effect when rubbed against each other.

Other feautres and advantages of the invention will become apparent from the description now to follow, of preferred embodiments thereof, given by way of example only, and in which reference will be made to the partly diagrammatical accompanying drawings, in which FIGURE 1 is a general perspective view of a supporting, storing and conveying device in accordance with the invention.

FIGURE 4 shows, at enlarged scale, a detail of the device of FIGURE 1.

Figure 2:
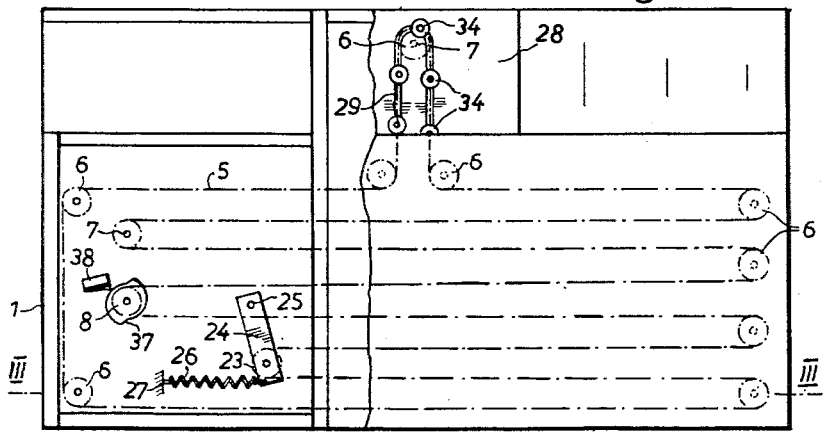
FIGURE 2 is a top view of such a device with parts broken away to show the parts contained in it.

The device represented in FIGURES 1 to 4 comprises a casing or housing 1 consisting of a rigid base 2 and of a cover 3 which, advantageously, is made of a transparent material and which covers the whole of the base 2. Between the base 2 and the cover 3 there is arranged an intermediate plate 4.

An endless conveying chain 5 is also arranged in the casing 1. This chain 5 may be of the "Reynold" type as it is widely used on bicycles. It is guided on pulleys 6 mounted on axles 7 secured to the intermediate plate 4. The pulleys 6 are arranged so as to impart to the chain 5 a zig-zag shaped path. The chain is driven as is visible on FIGURE 4 by a chain wheel 8 seated on a shaft 9 rotatably mounted in the intermediate plate 4 through roller bearings 10. The chain wheel 8 is secured to the shaft 9 by means of a nut 11. Reference numeral 12 indicates a washer arranged between the chain wheel and this nut.

Figure 3:
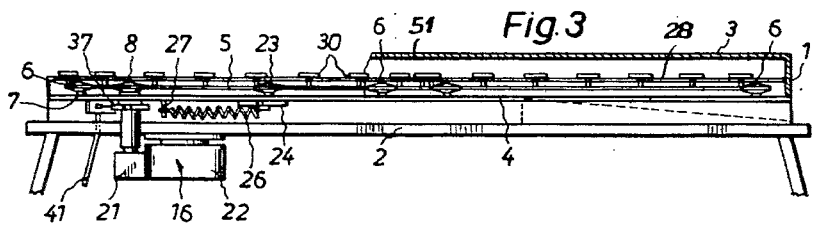
FIGURE 3 is a section taken along the line III—III of FIGURE 2.

The lower portion of the shaft 9 carries a disk 13 provided with a pin 14. This pin 14 is arranged eccentrically and projects perpendicularly away from the disk surface. This pin 14 affords for the coupling of the shaft 9 with a driving shaft 15 driven by an electromotor 16 (FIGURE 3). The shaft 15 in turn carries a sleeve 17 secured thereto by a screw 18 and adapted to be engaged about an extension 19 of the shaft 9, whereby a boring 20 in the sleeve 17 permits engagement of the sleeve about the pin 14. The shaft 15 is in turn driven by the motor 16 through a reduction gear arranged in a housing 21 coupled to the casing 22 of the motor 16 (FIGURE 3).

One of the guiding pulleys for the chain 5, i.e., that designated by reference numeral 23 in FIGURE 2, is carried on a lever arm 24 pivoted as at 25 to the intermediate plate 4. This arm 24 is loaded by a spring 26 secured as at 27 to the intermediate plate 4. By this arrangement the pulley 23, in combination with the arm 24 and the spring 26, forms a tensioning means for the chain 5.

The casing or housing 1 further contains a platform 28 projecting on one side of the housing out of the latter. The chain 5 is guided by the pulleys 6 underneath this platform 28 and the latter is provided with a slot 29 closely following the path of the chain 5 under the platform 28.

The chain 5 carries a plurality of supports 30 connected with the chain elements by connecting pieces 31 which, in the represented embodiment and as shown in FIGURE 4 are formed by prolongations of the pivot axes 32 between adjacent chain elements. An opening 33 in the casing 1 affords for the passage of the supports 30 out of the casing and onto the outer portion of the platform 28 and the working place formed thereby. The connecting pieces 31 pass through the slot 29. Onto each of the supports 30 there is arranged a piece-holder 34 adapted to receive one apparatus to be assembled. In the represented embodiment each of the piece-holders 34 has, on opposite sides, a shape 35 and 36, respectively, each adapted to receive an apparatus to be mounted, for example a micro-switch or a watch movement. The two shapes 35 and 36 on one and the same piece-holder 34 are of different dimensions so as to permit use of the described device for assembling apparatus of different sizes by inverting the piece-holders 34 on their supports 30.

As is easily understood from the preceding description the starting of the motor 16 results in the movement of the chain 5 and in the successive passage of the supports 30 on the working place constituted by the platform 28. Moreover the latter serves as a counter-support at the working place for stabilizing at this precise point the apparatus to be assembled.

However, in order that the worker may effect a determinated operation or several determinated operations on each of the apparatus in the device when it comes to the working place it is necessary to have these apparatus fed to the working place stepwise. To this end the shaft 9 carries a cam 37 arranged about the disk 13. This cam 37 serves to control a switch 38 connected into the feed circuit for the motor 16. The cam surface of this cam 37 is of such shape as to produce an interruption in the feed of electrical current to the motor 16 after each displacement of the chain 5 about a distance equal to that separating two adjacent connecting pieces 31. Moreover the position of the cam 37 on the shaft 9 is such that each time the chain 5 stops a support 30 is exactly on the extreme position on the platform 28, which position corresponds to the working place and which also is that position which makes accessible the apparatus to be assembled as well from the sides as also from the front side of the device. After having terminated the assembling operations which he has to effect on the apparatus which is on the working place the worker produces a next displacement step of the chain 5 by actuating a switch which in turn shunts the switch 38. Preferably this switch is arranged and constructed to be actuated over a lever 41 by the knee of the worker and is normally maintained in open position. In order to obtain the advance of the chain about one step all the worker has to do is to shortly actuate lever 41 which starts the motor 16. The motor starts to run even after the worker has released the lever 41, since the cam 37 having rotated about a certain angle makes possible for the switch 38 to be closed.

The chain is driven until the next boss 43 on the cam surface of the cam 37 again opens the switch 38 which happens as soon as the next following support 30 is on the extreme position on the platform that was just left by the preceding apparatus after the assembling operations had been made on it.

While in such manner all the apparatus to be assembled exception made of the one that is actually worked on and the apparatus adjacent to the latter are protected from dust by being stored and conveyed mainly within the housing this protection from dust is substantially improved by the present invention which renders possible to keep the air within the housing practically free from dust.

To this end according to the invention the relative movement between the movable parts and the stationary parts, when the device is in operation is used to produce a friction that leads to an electrostatical effect attracting dust particles suspended within the housing.

This is attained according to one embodiment by providing the supports 30 with slide shoes 50 of nylon and by making the platform 28 of a synthetic resin. The platform 28 will then be electrostatically charged by the frictional contact of the nylon slide shoes 50 of the supports 30 that slide on it when the device is in operation. As a result of such electrostatic charge the platform 28 will attract the dust particles that are in suspension in the atmosphere within the housing 1 and thus purify the air in the housing. The dust that has collected on the platform 28 may then easily be wiped away at the periodical cleaning of the device when the latter is free from apparatus to be assembled.

It may be desirable to make the cover 3 of the housing 1 of a material such as "Plexiglas" (trademark), the transparentness of which makes checking easy and improves the appearance of the device, but which itself may be charged electrostatically by friction. By accidental rubbing of the cover 3, for example with a duster cloth when the device is superficially cleaned at the end of a working day, it may then easily occur that the cover 3 in turn becomes attracting for dust particles and counteracts the effect of the desired electrostatical charge of the platform 28.

This may be avoided by providing the housing 1, and more particularly the cover 3 thereof with a coating 51 of an antistatic agent, in such manner that a charging of these parts that would counteract the attraction of the charged platform is prevented.

For example the innerside of the cover 3 could be coated with an antielectrostatic coating such as Ashton LT and 108, an anti-static coating sold by Onyx Oil and Chemical Co.

However it is also possible to make the cover 3 of the housing 1 or another part of the latter to be a dust catcher in place of the platform 28. In this case the platform 28 is preferably made of an electrically neutral material such as a synthetic resin having incorporated therein an anti-static material such as Nekal WS21 or WS25, a sodium aliphatic polyester sold by Antara Chemicals.

If, on the contrary, it is desired to have both the platform 28 and the cover 3 acting as dust collectors it is sufficient to make those parts of the supports 30 that come into frictional contact with the platform and with the cover of an electrically charging material such as, for example, nylon and, of course, also have the cover 3, as the platform 28 made of an appropriate synthetic material.

To prevent the dust particles, held by attraction to the platform and more particularly to the cover of the device, from dropping or otherwise being liberated when the part by which they are attracted should suddenly, e.g. accidentally be electrically uncharged, the inner side of the cover, or any desired charged surface may be provided with a coating of an adhesive mass to which the attracted particles adhere mechanically once they have been attracted.

I claim:

1. A supporting, storing and conveying device for the sequential assembly of small-sized apparatus, comprising a housing having an assembly platfrom extending laterally thereof, said housing having an opening therein opening out onto said assembly platform, an intermittently movable work conveyor within said housing and extending through said opening onto said assembly platform, said conveyor having apparatus holding members thereon for holding the apparatus to be assembled in position for assembling, a supporting platfrom within the housing and positioned immediately beneath said holding members, portions of said holding members coming into frictional contact with stationary portions of the device when the device is in operation, said holding member portions being of a material which on frictional engagement with the material of the stationary portions of the device produces an electro-static charge on said stationary portions, whereby dust particles suspended in the air within the housing are attracted to the charged stationary portions.

2. A device for the sequential assembly of small-size watch movements, comprising conveying means, a series of supports mounted on and guided by said conveying means, each support being adapted to receive a watch movement to be assembled in position for assembling, a platform along which said conveyor runs with said supports having the greater part thereof above said platform, a housing over said platfrom protecting said supports from dust, said housing having an opening therein through which the conveying means extends for the passage of the supports with watch movements therein toward a working place to which they are successively brought by the conveying means, said supports having at least one portion coming into frictional contact with a stationary portion of the device when the conveying means is in operation, said support portions being of a material which on frictional engagement with the material of the stationary portion of the device produces an electro-static charge on said stationary portions, whereby dust particles suspend in the air within the housing are attracted to the charged stationary portions.

3. A supporting storing and conveying device for the sequential assembly of small-sized apparatus, comprising a housing having an assembly platform extending laterally thereof, said housing having an opening therein opening out onto said assembly platform, an intermittently movable work coveyor within said housing and extending through said opening onto said assembly platform, said conveyor having apparatus members thereon for holding the apparatus to be assembled in position for assembling, a supporting platform within the housing and positioned immediately beneath said holding members, portions of said holding members coming into frictional contact with said platform when the device is in operation and sliding on said platform, said holding member portions being of a material which on frictional engagement with the platform produces an electro-static charge on the platform, whereby dust particles suspended in the air within the housing are attracted to the charged platform.

4. A device as claimed in claim 3, in which the platform is of synthetic resin and the holding member portions are shoes made fo nylon and adapted to produce said electro-static effect when sliding on the platform.

5. A supporting, storing and conveying device for the sequential assembly of small-sized apparatus, comprising a housing having an assembly platform extending laterally thereof, said housing having an opening therein opening out onto said assembly platform, an intermittently movable work conveyor within said housing and extending through said opening onto said assembly platform, said conveyor having apparatus holding members thereon for holding the apparatus to be assembled in position for assembling, a supporting platform within the housing and positioned immediately beneath said holding members, portions of said holding members coming into frictional contact with said platform when the device is in operation and sliding on said platform, said holding member portions being of a material which on frictional engagement with the platform produces an electro-static charge on the platform, said housing having a coating of an antistatic agent for preventing charging of the cover due to its coming in frictional contact with moving objects, whereby dust particles suspended in the air within the housing are attracted only to the charged platform.

6. A device as claimed in claim 5, in which said coating on the housing is a layer of an anti-electrostatic coating.

7. A supporting, storing and conveying device for the sequential assembly of small-sized apparatus, comprising a housing having an assembly platform extending laterally thereof, said housing having a cover with an opening therein opening out onto said assembly platform, an intermittently movable work conveyor within said housing and extending through said opening onto said assembly platform, said conveyor having apparatus holding members thereon for holding the apparatus to be assembled in position for assembling, portions of said holding members coming into frictional contact with said cover when the device is in operation, at least said cover being of an electrically chargeable synthetic material and said portions of said holding member coming in frictional contact therewith being of nylon for charging the cover with an electro-static charge, whereby dust particles suspended in the air within the housing are attracted to the charged cover.

8. A supporting, storing and conveying device for the sequential assembly of small-sized apparatus, comprising a housing having an assembly platform extending laterally thereof, said housing having a cover with an opening therein opening out onto said assembly platform, an intermittently movable work conveyor within said housing and extending through said opening onto said assembly platform, said conveyor having apparatus holding members thereon for holding the apparatus to be assembled in position for assembling, a supporting platform within the housing and positioned immediately beneath said holding members, said platform being of an electrically neutral material, portions of said holding members coming into frictional contact with said cover when the device is in operation, at least said cover being of an electricaly chargeable synthetic material and said portions of said holding members coming in frictional contact therewith being of nylon for charging the cover with an electrostatic charge, whereby dust particles suspended in the air within the housing are attracted to the charged cover.

9. A supporting, storing and conveying device for the sequential assembly of small-sized apparatus, comprising a housing having an assembly platform extending laterally thereof, said housing having a cover with an opening therein opening out onto said assembly platform, an intermittently movable work conveyor within said housing and extending through said opening onto said assembly platform, said conveyor having apparatus holding members thereon for holding the apparatus to be assembled in position for assembling, a supporting platform within the housing and positioned immediately beneath said holding members, said platform being of an electrically neutral material, portions of said holding members coming into frictional contact with said cover when the device is in operation, at least said cover being of an electrically chargeable synthetic material and said portions of said holding member coming in frictional contact therewith being of nylon for charging the cover with an electro-static charge, whereby dust particles suspended in the air within the housing are attracted to the charged cover, the inside surface of said cover being covered with a sticky material to which attracted dust particles adhere.

References Cited by the Examiner

UNITED STATES PATENTS

| | | | |
|---|---|---|---|
| 2,866,538 | 12/1958 | Goldberg | 198—189 |
| 2,945,605 | 7/1960 | Menough | 198—131 X |
| 2,999,341 | 9/1961 | Alexander et al. | 134—1 X |
| 3,071,497 | 1/1963 | Hinson | 15—1.5 X |

FOREIGN PATENTS 47,998  6/1930  Norway.

HUGO O. SCHULZ, *Primary Examiner.*

SAMUEL F. COLEMAN, *Examiner.*

R. E. KRISHER, *Assistant Examiner.*